United States Patent [19]

MacCormack et al.

[11] Patent Number: 6,006,276
[45] Date of Patent: Dec. 21, 1999

[54] ENHANCED VIDEO DATA COMPRESSION IN INTELLIGENT VIDEO INFORMATION MANAGEMENT SYSTEM

[75] Inventors: David Ross MacCormack, San Diego; Patrick O. Nunally, Delmar, both of Calif.

[73] Assignee: Sensormatic Electronics Corporation, Boca Raton, Fla.

[21] Appl. No.: 09/069,364

[22] Filed: Apr. 29, 1998

Related U.S. Application Data

[63] Continuation-in-part of application No. 08/741,914, Oct. 31, 1996, Pat. No. 5,828,848.

[51] Int. Cl.[6] ........................................ H04N 9/79
[52] U.S. Cl. ............................. 709/253; 709/266
[58] Field of Search .................. 709/261, 266, 709/267, 277

[56] References Cited

U.S. PATENT DOCUMENTS

| | | | |
|---|---|---|---|
| 4,849,810 | 7/1989 | Ericsson | 358/133 |
| 4,918,523 | 4/1990 | Simon et al. | 358/133 |
| 5,229,862 | 7/1993 | Takahashi et al. | 358/335 |
| 5,463,565 | 10/1995 | Cookson et al. | 364/514 R |
| 5,550,640 | 8/1996 | Tsuboi et al. | 358/335 |
| 5,703,966 | 12/1997 | Astle | 382/236 |
| 5,909,511 | 6/1999 | Yoshimoto | 382/236 |
| 5,909,548 | 6/1999 | Klein et al. | 340/825.06 |
| 5,917,958 | 6/1999 | Nunally et al. | 382/276 |
| 5,933,534 | 8/1999 | Yoshimoto et al. | 382/236 |

*Primary Examiner*—Thomas R. Peeso
*Attorney, Agent, or Firm*—Robin, Blecker & Daley

[57] ABSTRACT

A video image data field to be compression-encoded is divided into rectangular blocks. Each of the rectangular blocks is compared with a corresponding block of a reference image to generate comparison data. The block of the image to be encoded is selected for representation if the comparison data for the block meets a selection criterion. The comparison data is generated on the basis of coefficients formed by applying an orthogonal transform to the blocks of the reference image and to the blocks of the image to be encoded. Mapping data is generated which is indicative of locations in the image plane corresponding to the selected blocks. The image to be encoded is represented in compressed form by header data, the mapping data and image data representative of the selected blocks. When the reference image is compression encoded, the blocks may be expanded in areas of the reference image which correspond to a low information density.

35 Claims, 12 Drawing Sheets

VR/PC

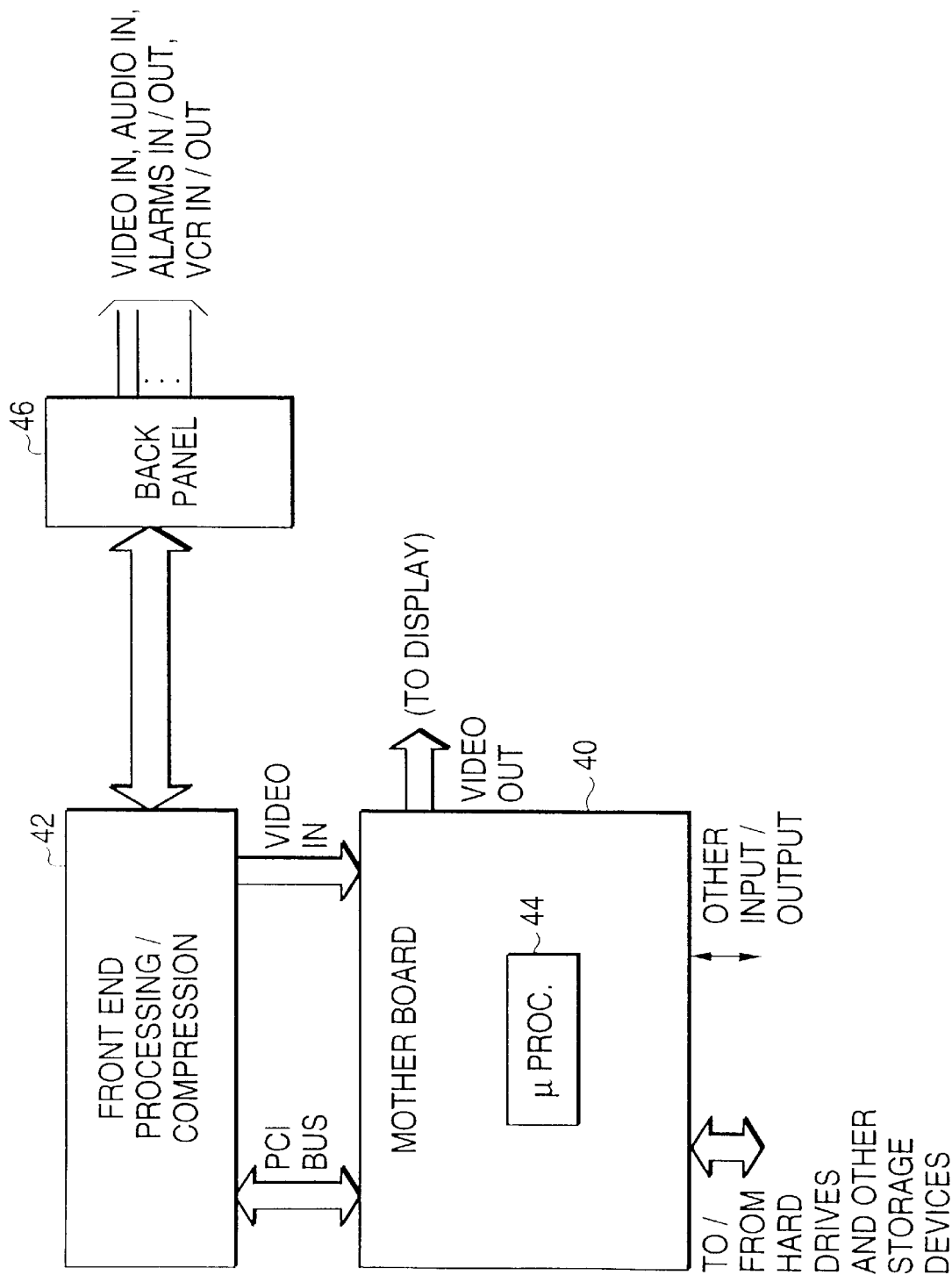

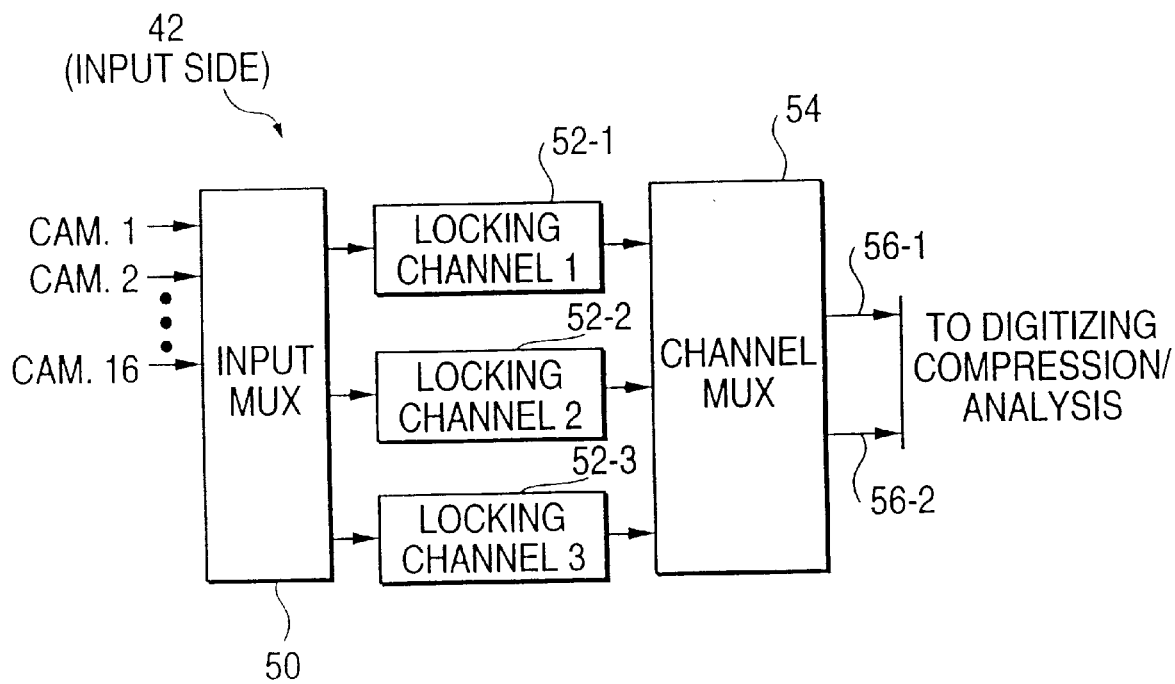
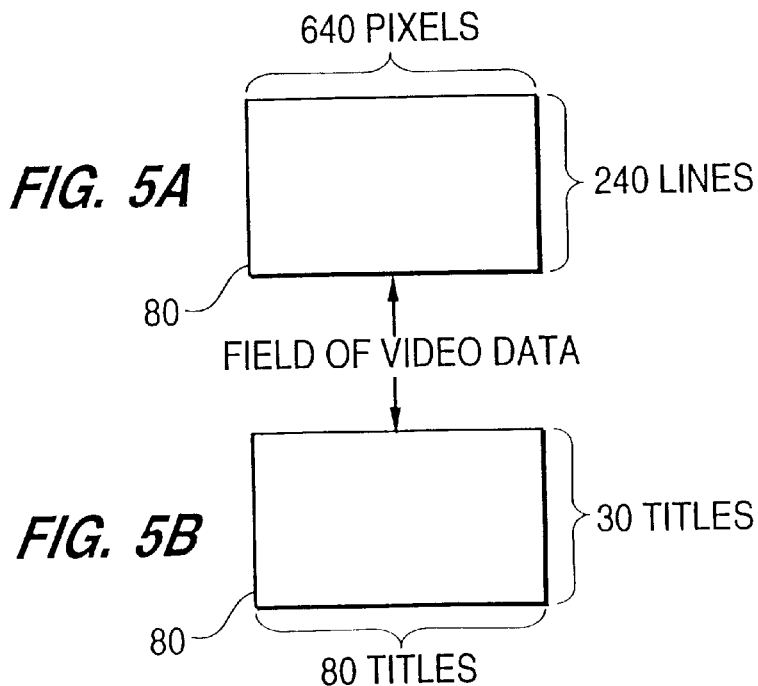

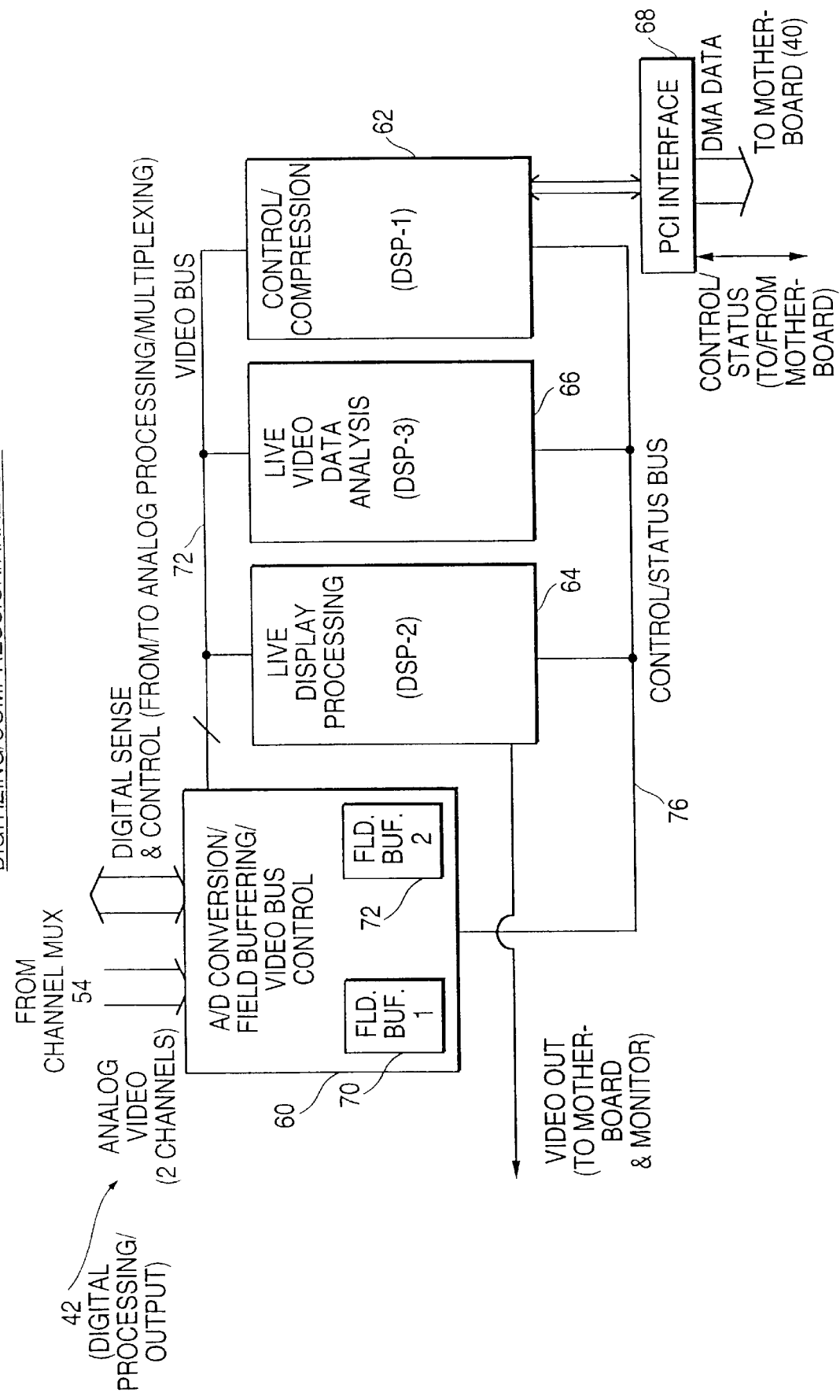

PIXEL BLOCK ('TILE')
(8x8)

MINIMUM CODING UNIT (MCU)
(IMAGE PLANE)

4:1:1
DATA FORMAT

MINIMUM CODING UNIT (MCU)
(COLOR VIDEO DATA)

DIFFERENCE DATA FORMAT

DECOMPRESSION USES 'POSTAGE STAMPS'

COEFFICIENT DATA ARRAY

PIXEL BLOCK SELECTION

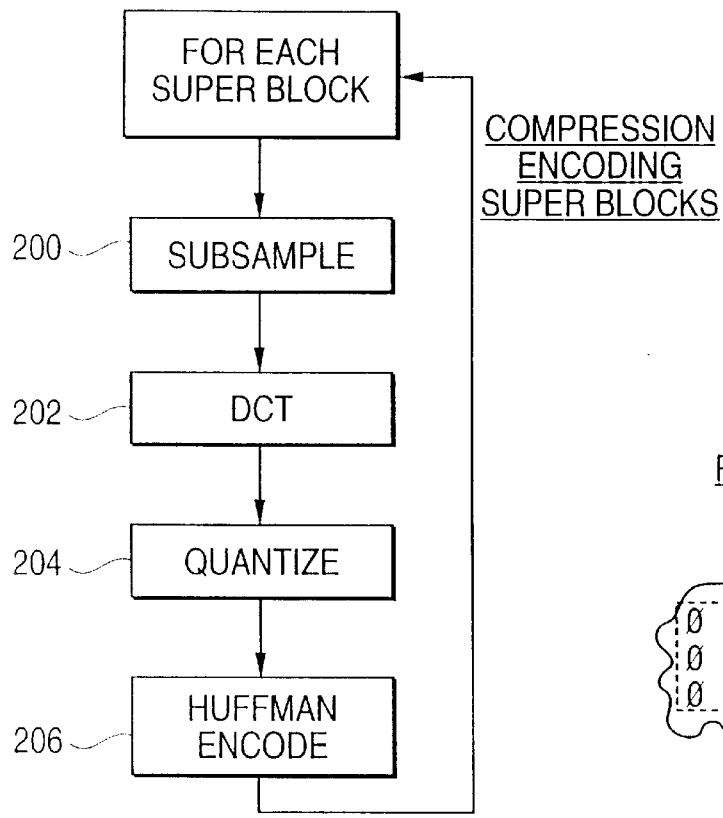
FIG. 19
FOR EACH SUPER BLOCK → 200 SUBSAMPLE → 202 DCT → 204 QUANTIZE → 206 HUFFMAN ENCODE
COMPRESSION ENCODING SUPER BLOCKS
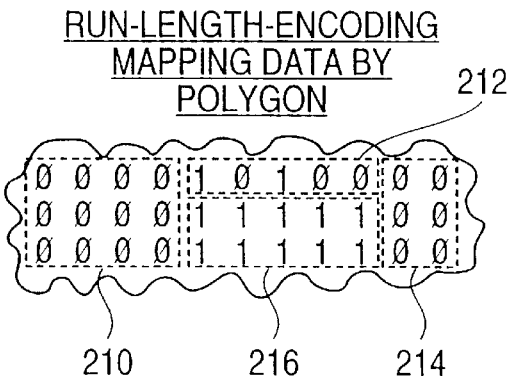
FIG. 21
RUN-LENGTH-ENCODING MAPPING DATA BY POLYGON
210, 216, 214, 212
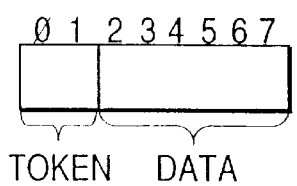
FIG. 20A
0 1 2 3 4 5 6 7
TOKEN DATA
FIG. 20B
| TOKEN | DATA TYPE |
|---|---|
| 0 0 | NO. OF SUCCESSIVE 0'S |
| 0 1 | NO. OF SUCCESSIVE 1'S |
| 1 0 | NO. OF RAW DATA BYTES |
| 1 1 | RAW DATA (6 BITS) |
DATA FORMAT: RUN-LENGTH-ENCODED MAPPING DATA

ENHANCED VIDEO DATA COMPRESSION IN INTELLIGENT VIDEO INFORMATION MANAGEMENT SYSTEM

CROSS-REFERENCE TO RELATED APPLICATION

This application is a continuation-in-part of prior application Ser. No. 08/741,914, filed Oct. 31, 1996 now U.S. Pat, No. 5,828,848. The disclosure of the parent application, Ser. No. 08/741,914, is incorporated herein by reference. Also to be noted is another related application, Ser. No. 08/729,620, also filed Oct. 31, 1996 (for which the issue fee has been paid), now U.S. Pat. No. 5,822,542).

BACKGROUND OF THE INVENTION

The above-referenced parent patent application discloses a digital video recorder which has intelligent video information management capabilities.

In any digital video recording apparatus, the large quantity of data inherently present in streams of video signals tends to require difficult trade-offs to be made between the storage capacity to be provided by the apparatus and the image quality to be available upon reproduction of the recorded video signals. The trade-offs can be particularly critical when it is desired to provide random access to the recorded video signal, as is the case in the intelligent video information management (IVIM) recorder disclosed in the parent patent application. In a preferred embodiment of the IVIM recorder, recording of video signal streams generated by up to 16 cameras, with random access playback, is provided on one or more hard disk drives. To achieve an adequate recording duration on the hard disk drives, a number of compression strategies were proposed in the parent patent application.

The present inventors have developed additional features related to the compression strategies disclosed in the parent patent application so as to provide more efficient utilization of data storage capacity and/or improved image quality, albeit with requirements for additional processing during compression-encoding operations.

OBJECTS AND SUMMARY OF THE INVENTION

It is an object of the invention to provide a method and apparatus for compressing, with a high degree of efficiency, video data representing streams of dynamic video images.

It is a more particular object of the invention to provide improvements upon, and alternative embodiments of, the "conditional refresh" video data compression strategy disclosed in the parent patent application.

According to a first aspect of the invention, there is provided a method of representing video data in compressed form, including the steps of dividing into rectangular blocks a present image to be compressed, the present image being formed in an image plane, each of the rectangular blocks consisting of n pixel blocks, each of the pixel blocks corresponding to an m pixel by m pixel segment of the image plane, n being an integer greater than or equal to 1, m being an integer greater than 1; comparing each of the rectangular blocks of the present image with a corresponding rectangular block of a reference image to generate comparison data for the block of the present image; selecting for representation the rectangular blocks of the present image for which the generated comparison data meets a selection criterion; generating mapping data indicative of locations in the image plane which correspond to the selected rectangular blocks for the present image; and representing the present image in compressed form by use of (a) header data for identifying the present image, (b) the mapping data generated for the present image, and (c) image data representative of the selected rectangular blocks of the present image; wherein the comparing step includes applying an orthogonal transformation to at least one pixel block of the n pixel blocks of each rectangular block of the present image to form coefficient data, and comparing the coefficient data with corresponding coefficient data for a corresponding pixel block in the reference image. The comparing step may include comparing a coefficient which represents a DC component of the coefficient data for each pixel block of the present image with a coefficient which represents a DC component of the coefficient data for the corresponding pixel block of the reference image, and may also include comparing a coefficient which represents a frequency component of the coefficient data for at least one pixel block of the present image with a coefficient which represents a corresponding frequency component of the coefficient data for the corresponding pixel block of the reference image. The orthogonal transformation to be performed as part of the comparing step may be the discrete cosine transform (DCT), and the image data to be used in representing the present image in compressed form for the selected rectangular blocks may be formed by quantizing and Huffman-encoding the coefficient data produced by the DCT.

According to a second aspect of the invention, there is provided a method of representing video data in compressed form, including the steps of dividing into rectangular blocks a present image to be compressed, the present image being formed in an image plane, each of the rectangular blocks consisting of n pixel blocks, each of the pixel blocks corresponding to an m pixel by m pixel segment of the image plane, n being an integer greater than or equal to 1, m being an integer greater than 1; applying an orthogonal transformation to at least one pixel block of the n pixel blocks of each rectangular block of the present image to form coefficient data; comparing the coefficient data with corresponding coefficient data for a corresponding pixel block in a reference image to generate comparison data for the rectangular block which includes the pixel block of the present image; selecting for representation the rectangular blocks of the present image for which the generated comparison data meets a selection criterion; and generating compressed image data only for the selected rectangular blocks of the present image.

According to a third aspect of the invention, there is provided apparatus for storing compressed video data, including circuitry for receiving video signals representing a dynamic sequence of images, circuitry for converting the video signals into a sequence of video data fields, processing circuitry for compressing the video data fields, and a storage device for storing the compressed video data fields, wherein the processing circuitry is programmed to divide each of the video data fields into pixel blocks each corresponding to an m×m segment of an image plane (m being an integer greater than 1), apply an orthogonal transformation to each of the pixel blocks to form coefficient data, as to one of the images selected to be a reference image, store at least some of the coefficient data as reference data, as to the reference image, quantize the coefficient data to form quantization data and Huffman-encode the quantization data to form first storage data, cause the storage device to store the first storage data, as to one of the images subsequent to the reference image, compare the coefficient data corresponding to at least some of the pixel blocks of the subsequent image to the reference data for the corresponding pixel block of the reference image, on the basis of the comparison, select pixel blocks of the subsequent image for further processing and select portions of the reference data for updating, update the selected portions of the reference data using coefficient data corresponding to the selected pixel blocks of the subsequent image, quantize the coefficient data corresponding to the selected pixel blocks and Huffman-encode the resulting quantized coefficient data to form second storage data, and cause the storage device to store the second storage data.

According to a fourth aspect of the invention, there is provided a method of performing data compression with respect to image data, the image data being representative of pixels arrayed in an image plane, the method including the steps of dividing the image data into a plurality of basic data blocks, each of the basic data blocks representing a rectangular part of the image plane, all of the basic data blocks being of equal size, detecting a spatial frequency characteristic of each of a contiguous plurality of the basic data blocks, in dependence upon a result of the detecting step, selectively combining the contiguous plurality of the basic data blocks to form a combined data block, subsampling the combined data block to form a subsampled data block that is equal in size to the basic data blocks, and applying a transformation to the subsampled data block to form a block of coefficient data.

According to a fifth aspect of the invention, there is provided a method of performing data compression with respect to image data, the image data being representative of pixels arrayed in an image plane, the method including the steps of dividing the image data into a plurality of m×m pixel blocks, m being equal to $2^p$, p being an integer equal to or greater than 1, detecting a spatial frequency characteristic of each of a contiguous plurality of the m×m pixel blocks, in dependence upon a result of the detecting step, selectively combining the contiguous plurality of m×m pixel blocks to form a (m·$2^q$)×(m·$2^q$) pixel block, q being an integer equal to or greater than 1, processing the (m·$2^q$)×(m·$2^q$) pixel block to form a processed m×m data array representative of the (m·$2^q$)×(m·$2^q$) pixel block, and applying a transformation to the processed m×m data array to form a block of coefficient data.

According to a sixth aspect of the invention, there is provided a method of performing data compression with respect to image data, the image data being representative of pixels arrayed in an image plane, the method including the steps of dividing the image data into a plurality of m×m pixel blocks, m being equal to $2^p$, p being an integer equal to or greater than 1, combining a first contiguous plurality of the m×m pixel blocks to form an (m·$2^q$)×(m·$2^q$) pixel block, q being an integer equal to or greater than 1, processing the (m·$2^q$)×(m·$2^q$) pixel block to form a first processed m×m data array representative of the (m·$2^q$)×(m·$2^q$) pixel block, transform-encoding the first processed m×m data array to form compressed image data representative of the (m·$2^q$)×(m·$2^q$) pixel block, combining a second contiguous plurality of the m×m pixel blocks to form an (m·$2^r$)×(m·$2^r$) pixel block, r being an integer equal to or greater than 1, and r not being equal to q, processing the (m·$2^r$)×(m·$2^r$) pixel block to form a second processed m×m data array representative of the (m·$2^r$)×(m·$2^r$) pixel block, and transform-encoding the second processed m×m data array to form compressed image data representative of the (m·$2^r$)×(m·$2^r$) pixel block.

BRIEF DESCRIPTION OF THE DRAWINGS

FIG. 2 is a summary block diagram of electronic components of the VR/PC unit of FIG. 1.

FIG. 3 is a summary block diagram representative of analog signal multiplexing and processing circuits that are part of a front end processing/compression component shown in FIG. 2.

FIG. 4 is a block diagram representation of signal conversion and digital signal processing circuitry that is part of the front end processing/compression component shown in FIG. 2.

FIGS. 5A and 5B represent, respectively, raster-scan and rectangular tile formats of an image plane (field) of video data formed in the VR/PC unit.

FIG. 19 is a flow-chart representation of a transform-encoding process applied to over-sized pixel blocks in accordance with the invention.

FIGS. 20A and 20B together show a data format that may be employed for compression-encoding mapping data that is part of the image data format of FIG. 10.

FIG. 21 is a pictorial illustration of another compression-encoding technique that may be applied to the mapping data of FIG. 10.

DESCRIPTION OF PREFERRED EMBODIMENTS

Figure 1:
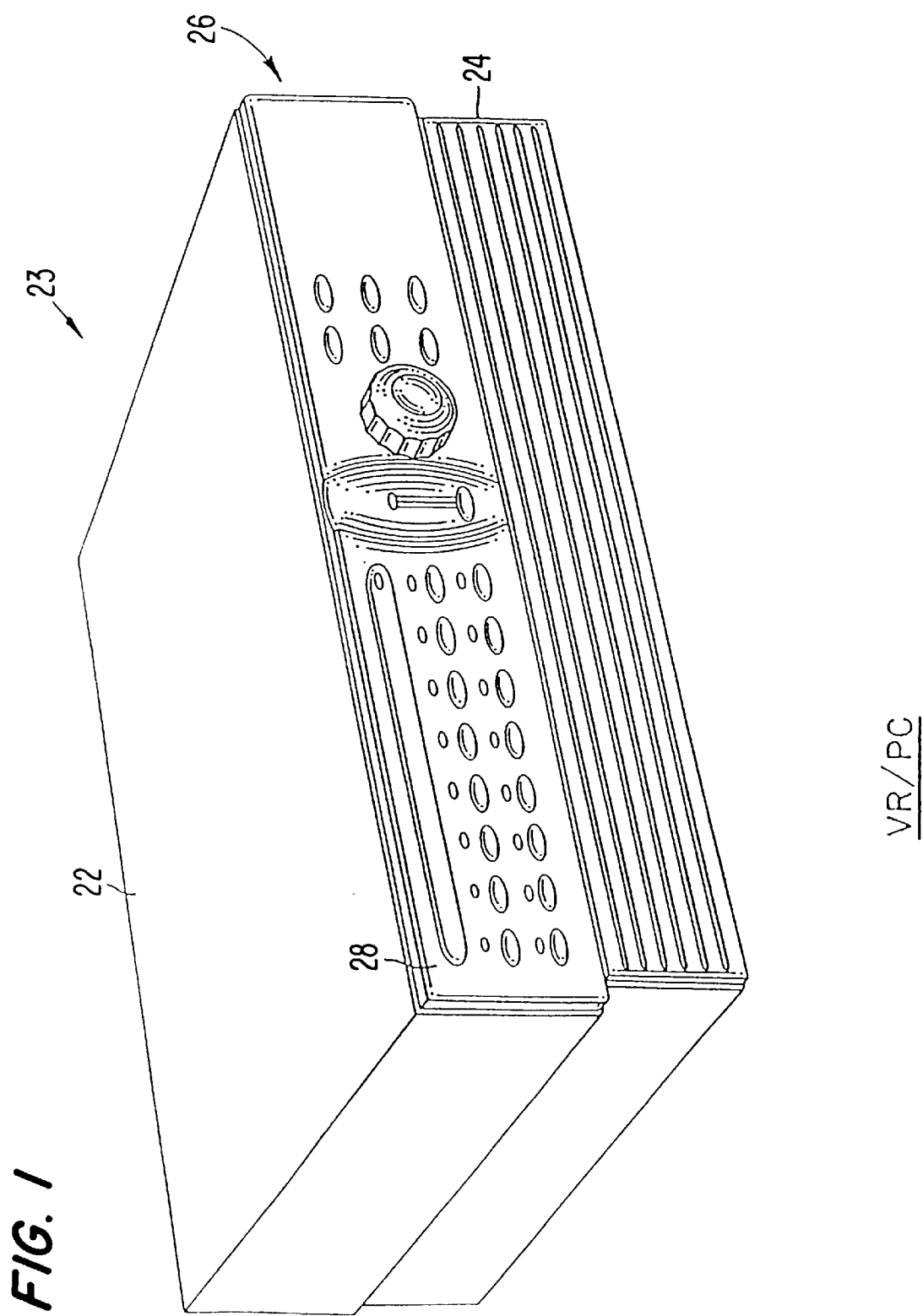
FIG. 1 is a perspective view of a video recording/personal computer (VR/PC) unit provided in accordance with the invention.

FIG. 1 is a perspective view of an integrated device which combines digital video recording, random access retrieval of recorded video data, and user-friendly personal-computer-based functionality. Reference numeral 23 generally indicates the integrated device, which may be referred to as a video recording/personal computer or "IVR/PC" unit. The VR/PC unit is adapted to receive streams of video signals generated by one or more video cameras. A preferred embodiment is configured to receive simultaneous input from 16 cameras (which are not shown in FIG. 1). The VR/PC unit also provides an output video signal, either live from one or more video cameras, or reproduced from video data storage facilities provided within the VR/PC unit, to drive one or more display monitors, which also are not shown in FIG. 1.

The internal components of the VR/PC unit 23 are contained within a molded plastic housing 22. As will be seen, the internal components include control and signal processing circuitry, as well as a number of data recording devices. For example, integrated within the VR/PC unit there are preferably two or more fixed or "hard" data recording drives of the magnetic type, as well as at least one drive for a removable data storage medium. A preferred embodiment includes both a floppy disk drive and a digital audio tape (DAT) drive. The floppy drive may be used for loading software programs; the DAT drive may be used to store video data, retrieved from the internal hard drives, for permanent or archival storage on a magnetic tape formatted in accordance with the standard DAT format. Access to the drives for removable media (which are not shown in the drawing) may be had via a hinged dust-shield 24 provided at a front elevation 26 of the housing 22. Also provided at the front elevation 26 is a front panel 28 on which a plurality of switches are mounted. The switches permit the user to control various functions such as selecting input cameras for recording, setting a format for a displayed video signal, and controlling playback operations.

A commercial embodiment of a VR/PC unit, of a type in which the present invention may be applied, is currently being sold under the trademark "INTELLEX" by the assignee of the present application, Sensormatic Electronics Corporation, Boca Raton, Fla.

An overview of the internal components of the VR/PC unit will now be provided, with reference to FIG. 2. As seen from FIG. 2, primary components include a motherboard 40 and front end processing/compression electronics 42.

The motherboard 40 provides the overall intelligence and control for the VR/PC unit. Preferably, the motherboard 40 is constructed in accordance with conventional architecture for personal computer motherboards. The central processing unit for the motherboard is preferably constituted by a conventional microprocessor 44, which may, for example, be one of the models of the well-known Pentium line of microprocessors.

The motherboard 40 controls, and exchanges data with, data storage devices such as the above-mentioned hard disk drives, DAT drive and floppy disk drive. The motherboard is also adapted to receive user control signals, which may be input via the front panel 28 (FIG. 1) or via conventional user input devices (not shown) such as a mouse and/or a keyboard. The motherboard 40 also exchanges data with the front end processing/compression electronics 42 while receiving an input digital video signal from the front end electronics 42, and providing an output video signal to a display monitor, which is not explicitly shown in FIG. 2.

It should be understood that the motherboard 40 includes conventional features such as program memory, working memory, input and output data communication ports, data signal bus connections, interfaces for recording medium drives, and video interface ports. All of these are preferably of conventional construction.

The front end electronics 42 provide signal processing with respect to input video signals received via a back panel 46. The arrangement of the front end electronics 42 may, in general, be like that incorporated in the above-mentioned INTELLEX video recorder and/or as disclosed in the above-referenced parent patent application.

FIGS. 3 and 4 together show some details of the front end electronics component 42 of FIG. 2. Certain features of the front end electronics 42 relating to analog signal multiplexing and processing are schematically illustrated in FIG. 3. At the input side of the front end electronics 42 is a multiplexer 50 which selects ones of the input camera streams for recording and/or display by the VR/PC unit. Any one of the input video signal streams may be assigned to any one of three video signal locking channels 52-1, 52-2 and 52-3. At the output side of the signal locking channels, a channel-selection multiplexer 54 is arranged to assign any one of the three signal locking channels to either one of two signal conversion channels 56-1 and 56-2.

FIG. 4 provides an overall view, in functional block form, of analog/digital conversion and digital processing circuitry included in the front end electronics component 42. Major functional blocks related to digitizing and digital processing include an analog-to-digital conversion, buffering and data formatting block 60, a control and compression processing block 62, a live video display processing block 64 and a live video image analysis block 66. Also included is an interface 68 for providing a connection with a PCI bus which interconnects the digital processing circuitry of the front end electronics 42 with the motherboard 40 (see FIG. 2).

Continuing to refer to FIG. 4, block 60 receives two channels of analog video acquired through and selected by the analog multiplexing and processing circuitry of FIG. 3, digitizes the two analog channels, and buffers fields of the digitized video data in buffers 70 and 72, respectively corresponding to the two channels. Control signals to be output to the analog multiplexing and processing circuitry of FIG. 3, and signals indicating the status of the analog circuitry, including sync signals, are received and transmitted through the block 60. In addition, the block 60 controls a video data bus 74 and distributes the buffered fields of video data to the blocks 62, 64 and 66. A control/status bus 76 interconnects the control block 62 and other blocks shown in FIG. 4 and permits the control block 62 to control the other blocks and to receive signals indicative of the status of the other blocks. Control and status signals ultimately transmitted to or from the analog circuitry of FIG. 3 are also carried on the control/status bus 76.

In addition to providing overall control of the functions of the circuitry of FIGS. 3 and 4, the block 62 also performs data compression processing with respect to the video data output on video bus 74. Block 64 provides display processing of the video signals carried on video bus 74 and outputs a processed video signal, including overlay information and image plane allocation, to the motherboard 40 and to display monitors (not shown). The block 66 performs moving image analysis with respect to the video data carried on the bus 74 to permit the VR/PC to detect characteristics of the images represented by the incoming video data.

Additional details relating to the blocks 60, 62, 64 and 66 may be found in the above-referenced parent patent application. As disclosed therein, the block 60 outputs fields of video data twice, once in a line-scan format, and a second time in the form of rectangular pixel blocks ('tiles'). Preferably, as disclosed in the parent application, the line-scan and tile data for each field are interleaved with each other via time-division-multiplexed operation of the video bus 74.

The processing circuitry of FIG. 4 may include four or more programmable digital signal processing devices (DSP's), including one each corresponding to blocks 62, 64 and 66 and a fourth processing device included in block 60 and programmed to establish the line-scan and tile video data formats described above. However, it is also contemplated to combine some of the processing represented as separate blocks in FIG. 4 for performance by a single processing device. For example, two DSP's may be programmed to carry out, between them, all of the live display processing, live video data analysis, front end control, and video data compression functions.

There will now be described aspects of the format in which the block 60 causes the video data to be transmitted on the video bus 74.

Figure 6:
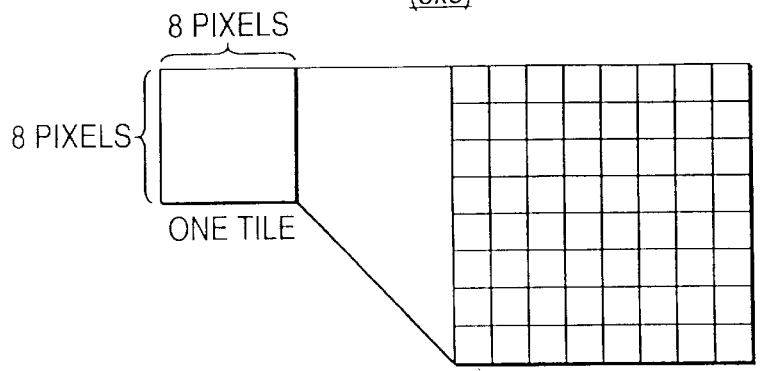
FIG. 6 illustrates a rectangular tile (pixel block) format employed in the VR/PC unit.

FIGS. 5A and 5B each show an image plane 80, which is divided, for internal data representation purposes, into 240 lines in the vertical direction, and each line is divided into 640 pixels in the horizontal direction. The image plane is also represented in the form of tiles or pixel blocks, each pixel block measures 8 pixels in both the horizontal and vertical directions (FIG. 6). The image plane is thus divided into 80 tiles in the horizontal direction and 30 tiles in the vertical direction (FIG. 5B).

Figure 8:
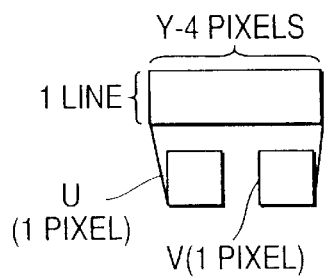
FIG. 8 represents a 4:1:1 color video data format employed in the VR/PC unit.

A 4:1:1 data format is employed whereby a group of four pixels is represented by four bytes of luminance data and two bytes of chrominance data. In effect, each line is divided into discrete groups of four pixels each, and for each such group four luminance pixel bytes are provided, as well as one byte of U-chrominance data and one byte of V-chrominance data (FIG. 8). This format contrasts with conventional 4:1:1 formats, in which each chrominance data byte corresponds to a two pixel by two pixel area of the image plane. The format utilized herein and illustrated in FIG. 8 helps to minimize "smearing" of the color information in the vertical direction and lessens any adverse effect upon image quality that may result from allocating only 240 horizontal lines to each video data field.

Figure 7:
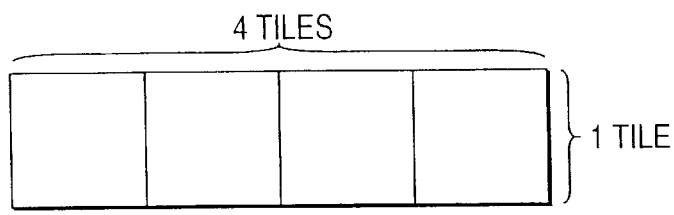
FIG. 7 represents the format of a minimum coding unit (MCU) employed in the VR/PC unit.
Figure 9:
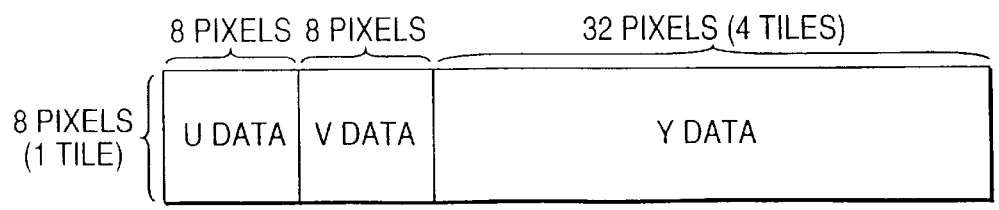
FIG. 9 is indicative of a color data format used for each MCU.

For compression encoding purposes, the image plane is divided into discrete groups of four horizontally-arrayed eight-by-eight tiles (FIG. 7). Each group of four horizontally sequential tiles constitutes a "minimum coding unit" (MCU). The data required to represent each MCU is made up of four eight-by-eight pixel blocks of luminance data, and one eight-by-eight block each of U data and V data, as shown in FIG. 9.

"Conditional Refresh" Data Compression

Figure 10:
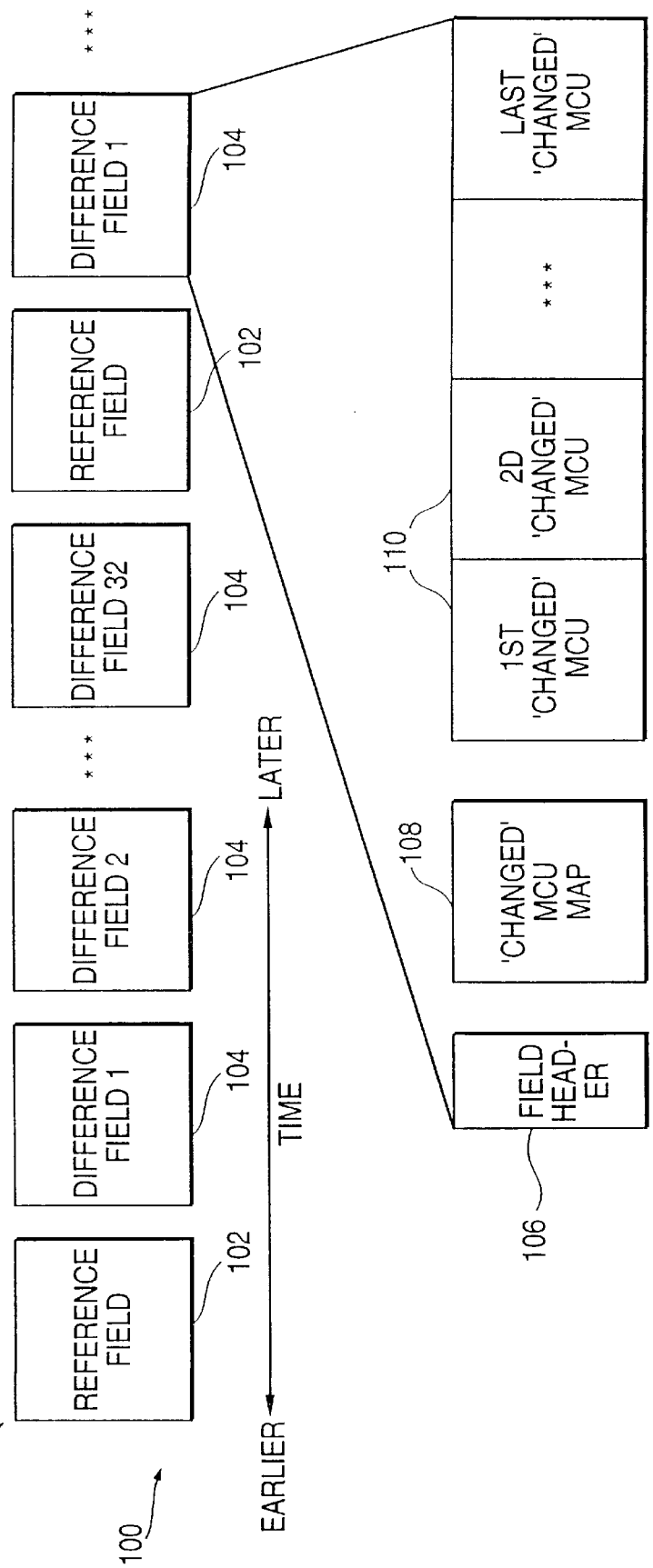
FIG. 10 is a representation of a data format used for compressed video data generated by the digital signal processing circuitry of FIG. 4.

A description of the format of the compressed video data, as formed at block 62 of FIG. 4, will now be provided with reference to FIG. 10.

After compression, a stream of video images produced by a given camera is represented as a sequence of data fields 100. There are two types of fields in the sequence of fields: "reference" image fields 102 and "difference" image fields 104. The reference fields 102 occur at regular intervals in the sequence of data fields. For example, in a preferred embodiment of the present compression technique, every thirty-third field in the sequence is a reference field; that is, thirty-two "difference" fields 104 are provided between each sequential pair of reference fields 102. The reference fields 102 are each compression encoded without reference to any other image. On the other hand, each of the different fields 104 is compression encoded with reference to one or more preceding images.

Each of the reference fields 102 begins with a field header (not shown in FIG. 10). The field header may include information for identifying the field, such as data identifying the camera which is the source of the field, an indication that the field is a reference image field for the purpose of data compression processing, an indication that the field is a reference image field for the purpose of image analysis, an indication whether the field is generated while the VR/PC is operating in a single camera mode such that only video information from one camera is being captured, an indication whether the field corresponds to even- or odd-numbered scanning lines, and an indication as to whether frames or fields of the video signal are being captured. Preferably, the field header also includes data to indicate the date and time at which the field was generated.

The balance of the reference field 102 is made up of compressed video data corresponding to every one of the 2400 tiles of the image plane (see FIG. 5B). In particular, the compressed video data making up the balance of the reference field is formed by processing every one of the 3600 eight-by-eight pixel blocks (2400 luminance pixel blocks and 1200 color information pixel blocks; six pixel blocks in all for each four tiles in the image plane; see FIG. 9). Compression-encoding is applied to each of the 3600 pixel blocks by the control/compression signal processing block 62 of FIG. 4. According to a preferred embodiment of the invention, the compression encoding of the pixel blocks of the reference field 102 is performed in accordance with the well-known JPEG compression-encoding standard. JPEG encoding entails conventional steps such as orthogonal (DCT) transformation, quantization of coefficient values, and Huffman (run-length) encoding.

On the other hand, as to the "difference" fields 104, compressed video data is provided only for selected tiles that represent "changes" relative to a preceding image. When there is little or no motion in the video image stream, very few, or none, of the tiles of the image plane are represented by image data in the respective difference field 104. In this way, a high degree of compression is realized.

As seen from the lower portion of FIG. 10, a typical difference data field 104 is made up of a field header 106, followed by map data 108 which indicates the portions of the image plane which were considered "changed" in the present image relative to a preceding image, and are accordingly represented by image data in the present difference data field 104. For example, the map data may consist of one bit for each of the 600 minimum coding units (MCUs) in the image plane, it being recalled that an MCU corresponds to a discrete horizontal sequence of four tiles in the image plane. For example, a "1" bit corresponding to a particular MCU would indicate that the MCU has been found to be "changed" and is represented by JPEG-compressed video data corresponding to the six pixel blocks for the MCU. A "zero" value for the bit corresponding to a particular MCU indicates that no data for the MCU is included in the present difference data field.

Following the changed MCU map 108 are data segments 110, each of which is made up of the JPEG-compressed image data corresponding to one of the changed MCU's indicated by the map data 108. The number of "1" bits in the map data is the same as the number of encoded MCU data segments 110.

Figure 11:
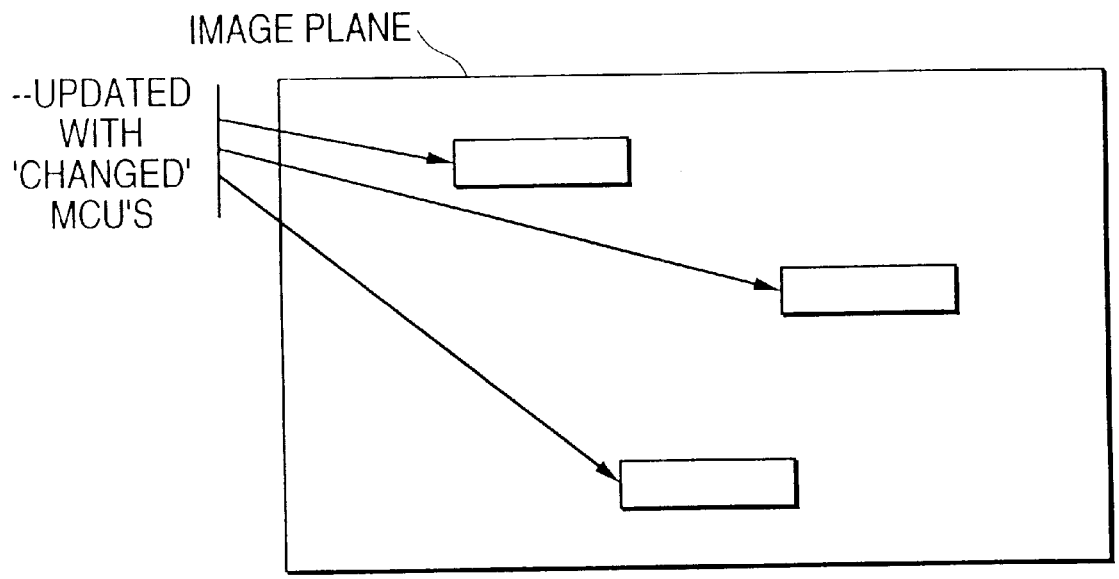
FIG. 11 is a pictorial representation of a technique used in the VR/PC unit for reconstituting a field of compressed video data.

The compression technique just described allows for image reconstruction (decompression) upon playback according to a process that is schematically illustrated in FIG. 11. According to this process, a reference field 102 is reconstituted simply by reversing the JPEG compression encoding in a conventional manner. Then, for the immediately following difference field, the changed MCU data segments 110 (FIG. 10) are each JPEG-decompressed, and each MCU of the resulting image data is substituted at the appropriate portion of the image plane as indicated by the changed MCU map. Referring again to FIG. 11, one may think of the process of constructing the first difference field as one of "pasting in" postage stamps (i.e., reconstituted MCU's) using the MCU map as a guide. Thus, the mapping data is used to steer the reconstituted MCU data to the appropriate portions of the image plane to provide the changes in the difference image relative to the reference image. This process is then repeated with respect to each of the succeeding difference fields. This process for reconstituting images upon playback can be referred to as a "conditional refresh" process, in the sense that the difference images are formed in a display buffer or the like, by refreshing relevant portions of the image plane on condition that changed MCU data corresponding to those regions is available.

Keep/Pitch Decision for Difference Field Pixel Blocks

Figure 13:
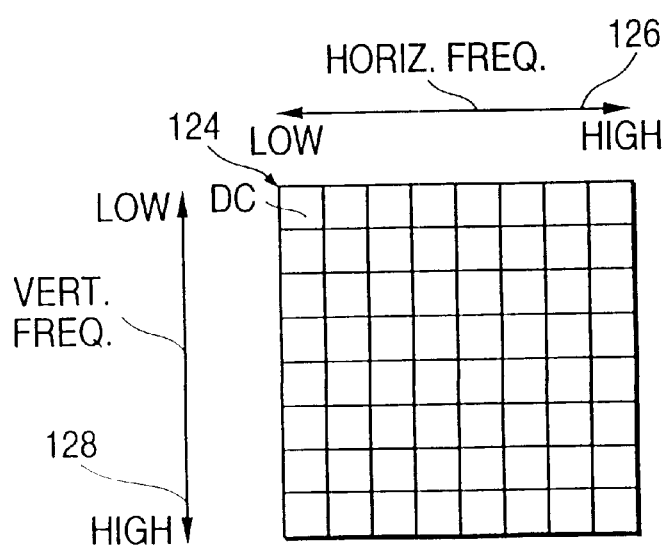
FIG. 13 represents a coefficient data array generated by conventional application of a two-dimensional DCT to an 8×8 pixel block.

A key portion of the compression encoding process for the difference fields entails determining whether a particular MCU is to be JPEG-encoded (because it is "different" from a corresponding reference MCU) or discarded (because it is "the same" as the reference MCU). The first aspect of the present invention is concerned with an improved technique for determining whether a particular MCU in a difference field is to be considered "the same" or "different" relative to a corresponding MCU in a reference image. The block selection process to be applied in accordance with the invention is illustrated in flow-chart form in FIG. 12. The process of FIG. 12 begins with a step 120, at which the first block of pixel data in the reference video field is fetched. Then, a two-dimensional DCT process is applied to the pixel block, in accordance with conventional practice for JPEG encoding (step 122). As will be recognized by those who are skilled in the art, the application of the DCT processing to the pixel block results in an eight-by-eight array of coefficient data, as schematically illustrated in FIG. 13. Conventionally, the data item 124 at the upper left-hand corner of the array corresponds to a DC component of the pixel block data that was subjected to the DCT processing. The other data items in the coefficient data array correspond to spatial frequency components of the pixel block data, with higher horizontal frequency components progressively arrayed to the right (as indicated at 126), and higher vertical frequency components progressively arrayed in a downward direction (as indicated at 128).

Figure 12:
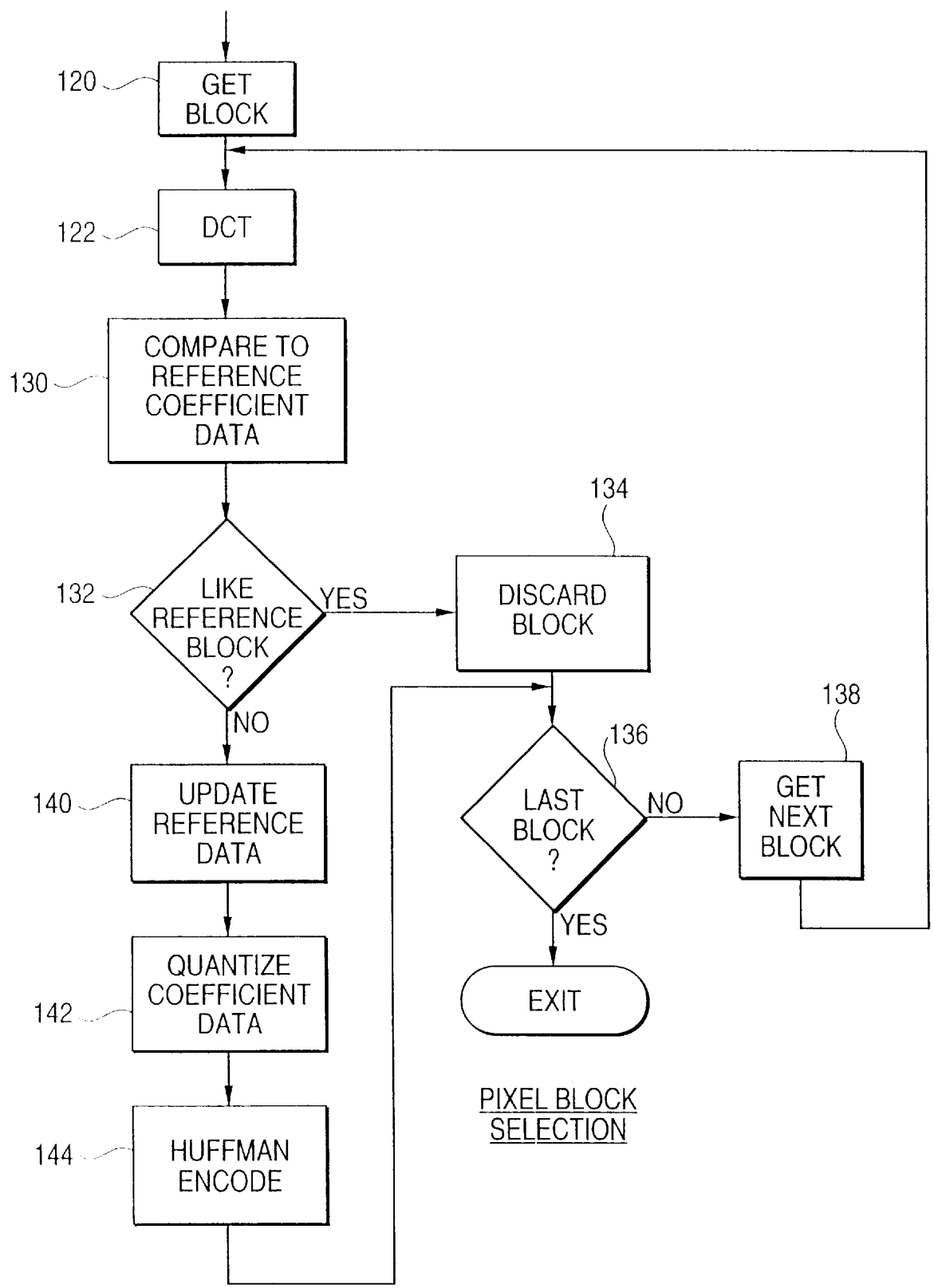
FIG. 12 is a flow-chart representation of an improved process for selecting pixel blocks for inclusion in a field of difference data included in the data format of FIG. 10.

According to the invention, the decision as to whether the pixel block of the present difference fields is "the same" or "different" relative to a corresponding pixel block of the reference field is made by comparing one or more of the coefficients generated at step 122 with corresponding coefficients that were previously generated and stored relative to the corresponding pixel block of the reference field. This comparison is indicated in FIG. 12 as step 130.

The comparison of the difference field coefficients to the reference field coefficients may be made on a number of different bases. For example, the DC coefficient for the pixel block of the difference image may be compared to the DC coefficient of the corresponding pixel block of the reference image. If the difference between the DC coefficients is greater than a given threshold, then the pixel block of the difference field would be declared "different". It is contemplated that in addition to comparison of the DC coefficients, one or more of the frequency band coefficients for the pixel block of the difference image may be compared to corresponding coefficients for the corresponding pixel block of the reference image and a "different" status declared for the pixel block of the difference image if a respective threshold or thresholds are exceeded by the difference in frequency band coefficients.

One advantage of basing the comparison both on the DC coefficient and one or more frequency band coefficients is that such an approach would permit the threshold for determining difference with respect to the DC components to be set relatively high. By using a high threshold with respect to the DC coefficient comparison, apparent changes in the pixel block for the difference image due to drift in the DC component (caused, for example, by gradual changes in illumination level) would not result in a finding that the pixel block was different. Consequently, the amount of image data to be included in the difference fields would be reduced in many circumstances, leading to increased compression efficiency.

When all pixel blocks in a region are unchanged, it may be desirable when reproducing a difference image to minimize block artifacts by low-pass filtering the data in the region.

Referring again to FIG. 12, it will be noted that the decision as to whether the pixel block of the difference field is "the same" or "different" relative to the corresponding pixel block of the reference image is indicated as a decision step 132. If the pixel block of the difference image is considered to be "the same", then the pixel block is discarded (step 134), and it is next determined whether there are more blocks to be processed in the difference image (step 136). If there are more blocks to be processed, then the next pixel block is fetched (step 138) and the process loops back to step 122.

Considering again the decision made at step 132, if the pixel block of the difference field is found to be "different" relative to the corresponding pixel block of the reference field, then the coefficient data for the reference field is updated (i.e. replaced by the corresponding coefficient data for the pixel block of the difference field) as indicated at step 140. Then, compression encoding for the pixel block of the difference field proceeds to completion. It will be understood that the DCT process carried out at step 122 corresponds to an initial part of the JPEG compression encoding process; upon finding that the pixel block of the difference field is to be retained and compression-encoded, the process is completed by quantizing the coefficient data produced at step 122 (as shown at step 142) and then Huffman encoding the quantized coefficient data (step 144). After step 144, the process advances to step 136, at which it is determined whether further pixel blocks of the difference field remain to be processed. If so, the next block is fetched and the process iterates. Otherwise, the processing of the difference field is complete.

According to a preferred embodiment of the invention, an entire MCU of data (corresponding to six pixel blocks) is considered to be different if any one of the six constituent pixel blocks is found to be different from the corresponding pixel block of the reference image. Consequently, once a pixel block is declared "different" each of the other pixel blocks in the same MCU is also declared "different", without actually comparing the other pixel blocks with the corresponding blocks of the reference image (and notwithstanding any previous finding of "sameness" in regard to the other pixel blocks of the MCU). Thus, if any pixel block in an MCU is found to be "different", then that block and the other constituent blocks of the MCU are JPEG encoded. It is therefore advisable that, even when a pixel block of a difference field has been found to be "the same" as the corresponding block of the reference field, the coefficient data for that block should be retained until all the other blocks in the MCU have also been found to be "the same".

From the foregoing, it will be seen that the present invention contemplates partitioning the JPEG compression-encoding process for the pixel blocks of the difference images into a preliminary portion (DCT processing) which is carried out for every block and a succeeding portion (quantization and Huffman-encoding) which is dispensed with in the event that the pixel block is to be discarded. The decision as to whether to discard the pixel block is based upon coefficient data generated by the DCT process. The partition of the JPEG-encoding process implies that JPEG encoding is to be performed by a general purpose processor that is suitably programmed, rather than by a conventional special-purpose JPEG chip. The increasing capabilities and reduced costs of processors makes it increasingly attractive to perform JPEG processing "in software". The flexibility provided by partitioning of the JPEG process permits the "difference"/"sameness" determination to be based on one or more of the DCT coefficients, so that the determination process can be tailored to particular applications.

Variable Pixel Block Sizing

According to another aspect of the invention, the above-described compression encoding technique is modified to improve the compression efficiency for the reference image data fields. In the previous discussion, it was assumed that all 3600 pixel blocks of the reference image (including 2400 luminance blocks and 600 each of U pixel blocks and V pixel blocks) were in an eight-by-eight format, and all were subjected to JPEG compression encoding. However, according to the present aspect of the invention, the size of the tiles in the reference image can be expanded in portions of the image where the information density is low, so that greater compression efficiency can be achieved.

Figure 14:
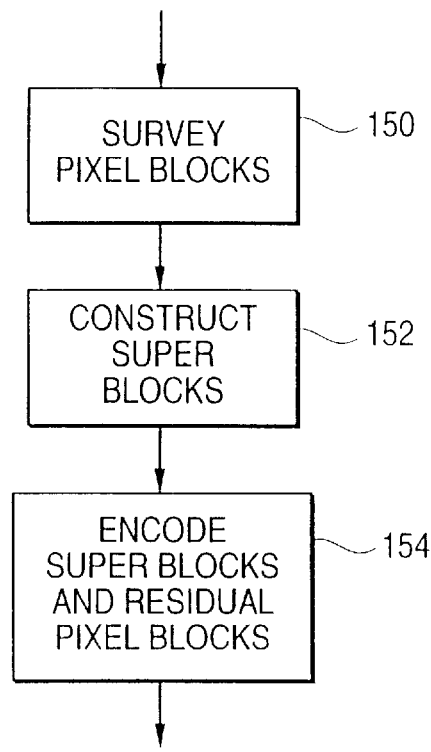
FIG. 14 is a high-level flow-chart representation of a process for carrying out image data compression utilizing adaptive sizing of pixel blocks.
Figure 15:
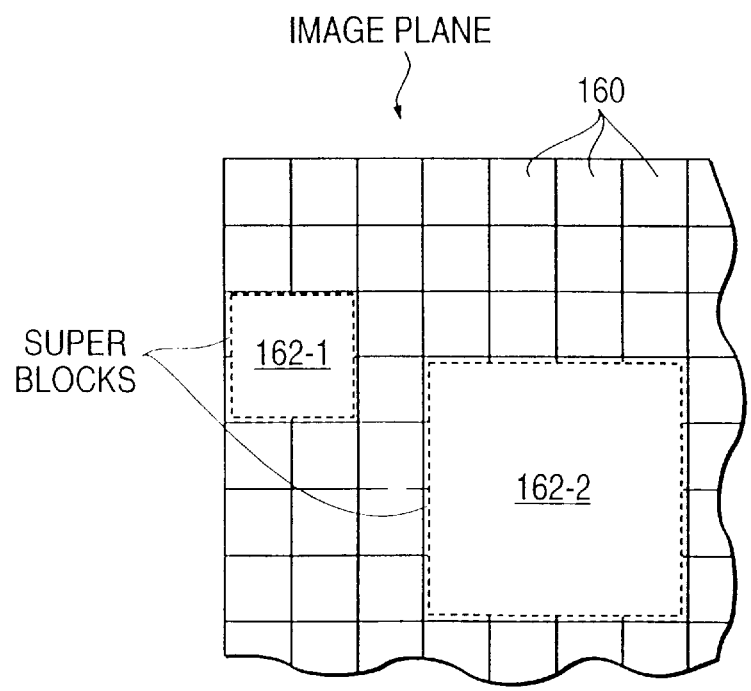
FIG. 15 is a pictorial illustration of the construction of pixel blocks of various sizes.

An overview of this aspect of the invention is provided in FIGS. 14 and 15. FIG. 14 summarizes the process carried out in accordance with this aspect of the invention. At a first step in FIG. 14, all of the pixel blocks (or, alternatively, all of the luminance blocks, but not the chrominance blocks), are surveyed to detect regions of the image plane in which the image density is low (step 150). On the basis of this survey, groups of adjacent pixel blocks, in the low information density areas, are designated for encoding together as "super blocks" (step 152). A transform encoding process is then carried out with respect to both the "super blocks" and with respect to the pixel blocks which were not included in any super block (i.e. those having a higher information content (step 154).

FIG. 15 pictorially illustrates the formation of super blocks from pixel blocks. In FIG. 15, the small squares (some of which are indicated by reference numeral 160) each represent a pixel block of a basic size (say, eight pixels by eight pixels). Super blocks 162-1 and 162-2 are shown, each formed at an area of the image plane which, it is assumed, was found to have a relatively low information density. It will be noted that super block 162-1 has been formed from a two-by-two array of basic-sized pixel blocks, and super block 162-2 has been formed as a four-by-four array of basic-sized pixel blocks.

Figure 16:
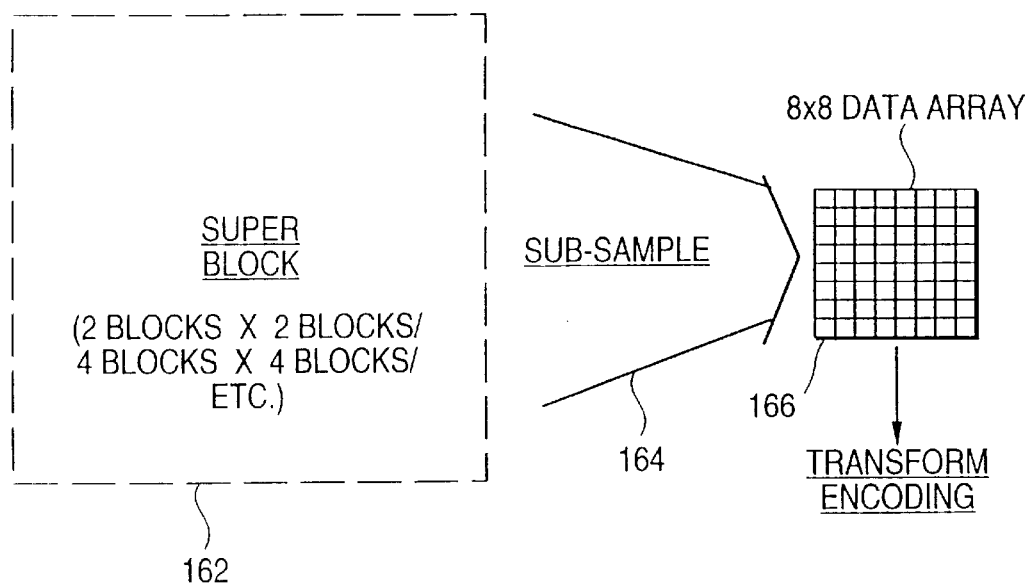
FIG. 16 is a pictorial representation of a process for converting an over-sized pixel block to a standard-sized array of image data.

FIG. 16 pictorially illustrates aspects of the process for transform-encoding the super blocks. As indicated at 164 in FIG. 16, a sub-sampling process (such as pixel-skipping, or low-pass filtering, etc., as discussed below) is applied to each super block to generate from the super block an eight-by-eight array of data 166 which corresponds in size to the basic-sized pixel blocks but represents the image in the larger area corresponding to the respective super block. It will be appreciated that the data array 166 is in a format such that it may be transform encoded (e.g., JPEG encoded) in the same manner as the basic-sized eight-by-eight pixel blocks.

Figure 17:
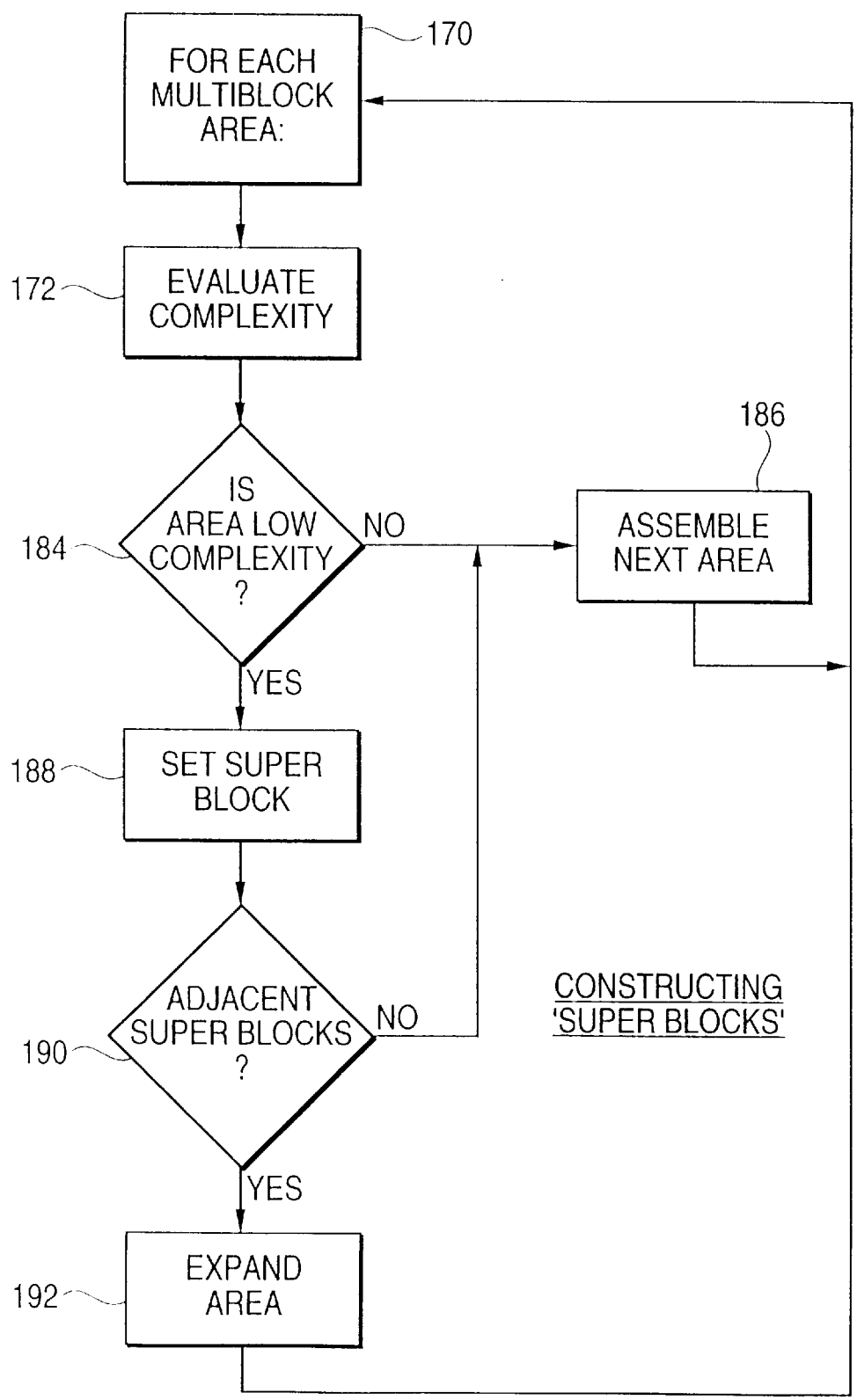
FIG. 17 is a flow-chart representation of processing carried out in connection with the construction of over-sized pixel blocks in accordance with the invention.

FIG. 17 shows details of the process step referred to in FIG. 14 as "construct super blocks". As indicated at step 170 in FIG. 17, the procedure of FIG. 17 is carried out for groups of adjacent eight-by-eight pixel blocks.

In connection with previous discussion herein, it was assumed that minimum coding units corresponding to four horizontally sequential tiles were used. However, for the purposes of the present discussion of variable tiles sizing, the minimum coding unit will be assumed to correspond to one eight-by-eight pixel block. It will be recognized that the teachings herein related to variable tile sizing may be adapted to compression schemes in which multi-block minimum coding units are employed.

For the purposes of the procedure of FIG. 17, each contiguous two-by-two group of pixel blocks will be considered to be a candidate for designation as a super block. Thus, for each candidate group of blocks, the complexity of the image in that group of blocks is evaluated (step 172) to determine whether the information content is high or low, with a high degree of complexity being indicative of a high information content.

Figure 18:
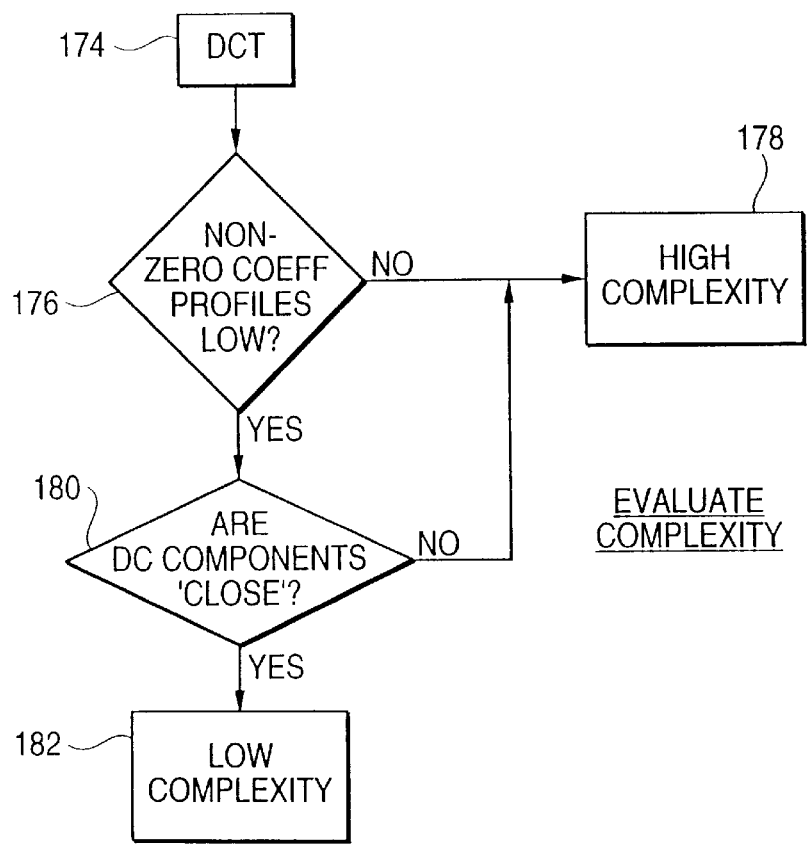
FIG. 18 is a flow-chart representation of processing carried out in connection with an "evaluate complexity" step shown in FIG. 17.

An example of how the complexity of a group of pixel blocks may be evaluated is illustrated in FIG. 18. Initially, a two-dimensional DCT process is applied to each pixel block in the group of pixel blocks (step 174). As indicated above, the resulting array of coefficient data may be presented as in FIG. 13. When there is a high degree of spatial correlation within a pixel block, the coefficients corresponding to higher spatial frequencies will either be zero or negligibly small. The coefficients which are not zero or negligible, may be referred to as "non-zero" coefficients. When the complexity and information content of a block are low, the non-zero coefficients will be clustered near the upper left-hand corner of the coefficient data array.

Thus, as indicated at step 176 in FIG. 18, the profile of non-zero coefficients for each of the pixel blocks is examined, to determine whether all of the non-zero coefficients fall within a predetermined range near the upper left-hand corner of the coefficient data array. If any of the non-zero coefficient profiles for the pixel blocks in the group of blocks does not meet this criterion, then the group of blocks is considered to exhibit high complexity, as indicated at block 178. If all of the non-zero coefficient profiles for the pixel blocks in the group meet the criterion, then step 180 follows, at which the DC components for the pixel blocks in the group are compared. If the range of values of the DC components is less than a predetermined threshold, then the group of blocks is considered to exhibit low complexity as indicated at 182. Otherwise, the group of blocks is considered to exhibit high complexity (step 178).

Referring again to FIG. 17, a decision block 184 indicates a determination of the outcome of the evaluation process of step 172. If the group of pixel blocks was not found to exhibit low complexity, then the next group of pixels to be considered is assembled (step 186) and the evaluation process is applied to this next group of pixel blocks.

On the other hand, if the evaluation process indicated that the group of pixel blocks exhibits low complexity, then the group of blocks is designated a "super block" (step 188) for the purpose of subsequent transform encoding. It is then determined whether the just-designated super block is adjacent to other groups of pixel blocks that have been designated "super blocks" (step 190). If so, the group of pixel blocks to be evaluated is expanded to include the just-designated super block and the adjacent super blocks (step 192) and evaluation proceeds with respect to the expanded group of pixel blocks. For the purpose of this evaluation, it will be appreciated that all of the constituent pixel blocks have already met the criterion in regard to the profiles of non-zero coefficients. Consequently, all that is necessary is to compare the DC components of the pixel blocks in the expanded area.

If at step 190 there were not found to be present adjacent super blocks required to form an expanded evaluation area together with the just-designated super block, then the process advances to step 186, at which the next group of pixel blocks is assembled prior to evaluation.

There are many schemes according to which the permissible boundaries for super blocks may be defined. If minimum coding units larger than pixel blocks are included in the compression-encoding scheme, it may be preferable to require that boundaries between super blocks coincide with boundaries between minimum coding units. According to a preferred scheme for defining super block boundaries (assuming that the degree of information density is sufficiently low), super blocks are square arrays of pixel blocks of the form, $2^p$ pixel blocks by $2^p$ pixel blocks, where p is an integer equal to or greater than 1. When this scheme is used, a uniform subsampling process may be applied iteratively to each super block until the resulting sub-sampled data array matches the size of the basic pixel blocks.

Any one of a number of subsampling techniques may be employed. For example, subsampling may be performed simply by skipping alternate pixels in the super block. Preferably the pixel-skipping is offset from line to line. Alternatively, two-dimensional interpolation may be employed to produce the subsampled pixel array. The interpolation technique may include linear averaging, 2-D finite impulse response filtering, or a bicubic spline.

FIG. 19 illustrates how a transform-encoding process is to be applied to each super block. As indicated at step 200, each super block is subsampled. As noted above, the subsampling should continue until the resulting subsampled data is of the same size as a basic pixel block. According to the example given above, the appropriate size would be an eight-by-eight array. There is then applied to the resulting sub-sampled data array the same transform encoding process (e.g., JPEG encoding) to be applied to pixel blocks that are not included in any super block. The JPEG encoding is represented by steps 202–206 in FIG. 19. The resulting array of coefficient data will be in the same format as the coefficient data produced for each basic-sized pixel block that is transform encoded independently of any other pixel block.

Preferably, arrays of coefficient data generated in respect of super blocks are marked with a suitable identifying code to indicate that the data has been produced from a super block and also to indicate the size of the super block. It is contemplated, for example, to use block identification codes that are undefined according to the JPEG standard.

It will be appreciated that upon de-coding (decompressing) the data, the Huffman-encoding, quantizing and orthogonal transformation steps are reversed with respect to each eight-by-eight array of coefficient data. If the corresponding array of coefficient data was not identified as the product of a super block, the resulting eight-by-eight array of image data is used without change to reconstitute a single pixel block in the image plane. If the coefficient data was the product of a super block, the reconstituted eight-by-eight image data array is up-sampled according to the indicated dimensions of the super block to generate pixel data for the reconstituted image. Preferably the up-sampling is performed according to a suitable method of interpolation from the eight-by-eight image data array.

It will be recognized that the above-described scheme of assembling super blocks from pixel blocks in areas of low information density provides for increased efficiency in transform encoding the so-called "reference images", with only a modest increase in the complexity of coding and decoding operations.

It is also contemplated to apply the above-described variable tile sizing technique in cases in which a fixed number of bits is allocated to represent the image, as in some data transmission or storage applications. The use of large tiles for low-information regions frees additional bandwidth which can be used for finer quantization of data representing information-rich regions. As a result higher perceived image quality is achieved.

Run-length Encoding of Mapping Data

In the video stream data format shown in FIG. 10, each "difference field" includes mapping data which indicates the locations in the image plane for which changed (refreshment) data is available. In this format, it was indicated that the mapping data may take the form of one bit for each minimum coding unit in the image plane.

When the video signal stream represents a substantially static image, it can be expected that most of the bits will correspond to "zero", since the portions of the image to be refreshed will be few. In this case, it is proposed to increase the coding efficiency with respect to the difference fields by run-length encoding the mapping data. While any conventional run-length encoding scheme may be employed, it is further proposed that one of the following alternatives be used.

According to the first alternative, the raw bits of mapping data are treated as consisting of a one-dimensional stream which is re-coded according to a data format shown in FIGS. 20A and 20B. As re-coded, the mapping data is a sequence of eight-bit bytes having the format shown in FIG. 20A. In this format, the first two bits are a token to identify the interpretation to be given to the data residing in the last six bits of the byte. An example of the tokens and their meaning is given in FIG. 20B. As shown in that drawing, the code '00' identifies data corresponding to the number of successive 'zeros' represented by the mapping data byte (that number being specified by the last six bits of the byte). The code '01' corresponds to the number of successive 'ones' represented by the mapping data byte (again the number of successive 'one' bits is specified by the last six bits of the byte). The code '10' indicates that the last six bits of the byte are indicative of the number of bytes of raw data to follow the present byte and, the code '11' indicates that the last six bits of the byte correspond to raw data.

According to a second alternative, the raw mapping data is considered to be an array of the same dimensions as the array of minimum coding units which constitutes the image plane. (For the example shown in FIGS. 5B and 7, the array would be twenty-across-by-thirty-down.) As pictorially illustrated in FIG. 21 (which represents only a portion of the mapping data array), the mapping data is partitioned into rectangular regions that are either of uniform bit types (all zeros or all ones) or of mixed types. In the particular example shown in FIG. 21, regions 210, 212, 214 and 216 are identified. A code string is then generated to represent the identified regions.

For example, the mapping data shown in FIG. 1 could be represented by the following string of codes. First, a predetermined code byte representative of a four-across-by-three-down array of zeros (to represent region 210), followed by a code byte to indicate that the following byte includes five bits of raw data and then a byte containing raw data bits corresponding to the region 212; then a predetermined code byte indicative of a two-across-by-three-down array of zeros (representing region 214); and then a predetermined code byte indicative of a five-across-by-two-down array of ones (representing region 216).

The second alternative described above is likely to be quite efficient in terms of partitioning the image plane between regions of motion and regions in which there is no motion.

The concept of run-length encoding the mapping data for reference fields in a conditional-refresh compression scheme may be applied either in a video data recorder such as that described herein, or in connection with transmission of video data through a communication channel, such as a telephone line. The "HyperScan" long distance video transmission system marketed by the assignee of the present application is an example of a system in which "conditional refresh" data compression with run-length encoding of mapping data could be employed.

It will also be recognized that two or more of the techniques described in this application may be combined in a single compression-encoding scheme. For example, it is contemplated to use all three of the techniques described herein—block selection using coefficient data, variable tile sizing, and run-length encoding of mapping data—in a single conditional-refresh compression encoding scheme.

The following variations in the above-described techniques are among those that could be made without departing from the present invention.

The 'changed' MCU data 110 of FIG. 10, instead of being transform-encoded replacement pixel data, could be formed by transform-encoded pixel-to-pixel differences between the 'changed' MCU pixels and the corresponding reference image pixels.

A 4:2:2 color data format could be employed instead of the 4:1:1 format described above.

A batch-mode compression process could be carried out in which all of the luminance data for an image is compressed first, followed by all of the U data for the image, then all of the V data. Batch mode processing is advantageous when carried out in a general-purpose processor since only one set of data tables needs to be loaded at a given time.

It is also contemplated to use basic tile sizes other than 8×8. For example, 16×16 basic tiles may be used.

What is claimed is:

1. A method of representing video data in compressed form, comprising the steps of:
dividing into rectangular blocks a present image to be compressed, the present image being formed in an image plane, each of said rectangular blocks consisting of n pixel blocks, each of said pixel blocks corresponding to an m pixel by m pixel segment of said image plane; n being an integer greater than or equal to 1; m being an integer greater than 1;
comparing each of said rectangular blocks of the present image with a corresponding rectangular block of a reference image to generate comparison data for the block of the present image;
selecting for representation the rectangular blocks of the present image for which the generated comparison data meets a selection criterion;
generating mapping data indicative of locations in the image plane which correspond to the selected rectangular blocks for the present image; and
representing the present image in compressed form by use of:
(a) header data for identifying the present image;
(b) said mapping data generated for the present image; and
(c) image data representative of the selected rectangular blocks of the present image;
wherein:
said comparing step includes applying an orthogonal transformation to at least one pixel block of the n pixel blocks of each rectangular block of the present image to form coefficient data, and comparing the coefficient data with corresponding coefficient data for a corresponding pixel block in the reference image.

2. A method according to claim 1, wherein said comparing step includes comparing a coefficient which represents a DC component of the coefficient data for at least one pixel block of the present image with a coefficient which represents a DC component of the coefficient data for the corresponding pixel block of the reference image.

3. A method according to claim 2, wherein said comparing step includes comparing a coefficient which represents a frequency component of the coefficient data for at least one pixel block of the present image with a coefficient which represents a corresponding frequency component of the coefficient data for the corresponding pixel block of the reference image.

4. A method according to claim 1, wherein said comparing step includes comparing a coefficient which represents a frequency component of the coefficient data for at least one pixel block of the present image with a coefficient which represents a corresponding frequency component of the coefficient data of the corresponding pixel block of the reference image.

5. A method according to claim 1, wherein said representing step includes applying quantization to the coefficient data formed for each selected rectangular block to obtain quantization data, and applying Huffman encoding to the quantization data to form said image data representative of the selected rectangular blocks of the present frame.

6. A method according to claim 5, wherein the orthogonal transform is the discrete cosine transform (DCT), and the application of said DCT, said quantization and said Huffman encoding are in accordance with the JPEG image data compression standard.

7. A method according to claim 1, wherein m=8.

8. A method according to claim 7, wherein n=4.

9. A method according to claim 8, wherein a rectangular block is selected for representation if any one of the four pixel blocks of the rectangular block meet a selection criterion.

10. A method according to claim 8, wherein each of said rectangular blocks consists of a horizontal sequence of four 8×8 pixel blocks.

11. A method according to claim 10, wherein four 8×8 luminance pixel arrays and exactly two 8×8 chrominance pixel arrays are formed for each rectangular block of the reference image.

12. A method according to claim 11, wherein one of the two 8×8 chrominance pixel arrays consists of U pixels and the other of said two 8×8 chrominance pixel arrays consists of V pixels.

13. A method of representing video data in compressed form, comprising the steps of:

dividing into rectangular blocks a present image to be compressed, the present image being formed in an image plane, each of said rectangular blocks consisting of n pixel blocks, each of said pixel blocks corresponding to an m pixel by m pixel segment of said image plane; n being an integer greater than or equal to 1; m being an integer greater than 1;

applying an orthogonal transformation to at least one pixel block of the n pixel blocks of each rectangular block of the present image to form coefficient data;

comparing the coefficient data with corresponding coefficient data for a corresponding pixel block in a reference image to generate comparison data for the rectangular block which includes the pixel block of the present image;

selecting for representation the rectangular blocks of the present image for which the generated comparison data meets a selection criterion; and generating compressed image data only for the selected rectangular blocks of the present image.

14. A method according to claim 13, wherein said step of generating compressed image data includes processing the coefficient data formed by applying said orthogonal transformation to the pixel blocks of the selected rectangular blocks of the present image.

15. A method according to claim 14, wherein said processing includes quantizing said coefficient data and Huffman encoding the quantized coefficient data.

16. A method according to claim 15, wherein said orthogonal transformation and said processing of the coefficient data are performed in accordance with the JPEG image data compression standard.

17. A method according to claim 13, wherein n=4 and m=8.

18. Apparatus for storing compressed video data, comprising:

means for receiving video signals representing a dynamic sequence of images;

means for converting the video signals into a sequence of video data fields;

processing means for compressing said video data fields; and means for storing the compressed video data fields;

said processing means being programmed to:
divide each of said video data fields into pixel blocks each corresponding to an m×m segment of an image plane, m being an integer greater than 1;
apply an orthogonal transformation to each of the pixel blocks to form coefficient data;
as to one of said images selected to be a reference image, store at least some of the coefficient data as reference data;
as to said reference image, quantize the coefficient data to form quantization data and Huffman-encode the quantization data to form first storage data;
cause the means for storing to store the first storage data;
as to one of said images subsequent to said reference image, compare the coefficient data corresponding to at least some of the pixel blocks of said subsequent image to the reference data for the corresponding pixel block of the reference image;
on the basis of said comparison, select pixel blocks of said subsequent image for further processing and select portions of the reference data for updating;
update the selected portions of the reference data using coefficient data corresponding to the selected pixel blocks of said subsequent image;
quantize the coefficient data corresponding to the selected pixel blocks and Huffman-encode the resulting quantized coefficient data to form second storage data; and
cause the means for storing to store the second storage data.

19. Apparatus according to claim 18, wherein said processing means includes a first processor for dividing the video data fields into said pixel blocks and a second processor for processing said pixel blocks formed by said first processor.

20. A method of performing data compression with respect to image data, said image data being representative of pixels arrayed in an image plane, the method comprising the steps of:

dividing said image data into a plurality of basic data blocks, each of said basic data blocks representing a rectangular part of said image plane, all of said basic data blocks being of equal size;

detecting a spatial frequency characteristic of each of a contiguous plurality of said basic data blocks;

in dependence upon a result of said detecting step, selectively combining said contiguous plurality of said basic data blocks to form a combined data block;

subsampling said combined data block to form a subsampled data block that is equal in size to said basic data blocks; and applying a transformation to said subsampled data block to form a block of coefficient data.

21. A method according to claim 20, wherein said detecting step includes:

applying a transformation to each basic data block of said contiguous plurality of basic data blocks, to form a respective array of coefficient data, some of said coefficient data representing respective spatial frequency components of the respective basic data block; and detecting a characteristic of at least one of said coefficient data representing spatial frequency components.

22. A method according to claim 21, wherein said transformation applied to each basic data block of said contiguous plurality of basic data blocks is a two-dimensional DCT.

23. A method according to claim 20, wherein said transformation applied to said subsampled combined data block is a two-dimensional DCT.

24. A method according to claim 20, wherein each of said basic data blocks consists of an 8×8 array of pixels.

25. A method according to claim 24, wherein said combined data block consists of an 8n×8n array of pixels, where n is an integer greater than 1, and said subsampling step comprises subsampling said combined data block by a factor of n in each of a horizontal direction and a vertical direction.

26. A method according to claim 24, wherein $n=2^p$, p being an integer equal to or greater than 1.

27. A method according to claim 20, further comprising the steps of:

combining a first contiguous plurality of said basic data blocks to form a first combined data block;

subsampling said first combined data block to form a first subsampled data block that is equal in size to said basic data blocks;

applying a transformation to said first subsampled data block to form a respective block of coefficient data therefrom;

combining a second contiguous plurality of said basic data blocks to form a second combined data block that is larger than said first combined data block;

subsampling said second combined data block to form a second subsampled data block that is equal in size to said first subsampled data block; and applying a transformation to said second subsampled data block to form a respective block of coefficients therefrom.

28. A method of performing data compression with respect to image data, said image data being representative of pixels arrayed in an image plane, the method comprising the steps of:

dividing said image data into a plurality of m×m pixel blocks, m being equal to $2^p$, p being an integer equal to or greater than 1;

detecting a spatial frequency characteristic of each of a contiguous plurality of said m×m pixel blocks;

in dependence upon a result of said detecting step, selectively combining said contiguous plurality of m×m pixel blocks to form an $(m \cdot 2^q) \times (m \cdot 2^q)$ pixel block, q being an integer equal to or greater than 1;

processing said $(m \cdot 2^q) \times (m \cdot 2^q)$ pixel block to form a processed m×m data array representative of said $(m \cdot 2^q) \times (m \cdot 2^q)$ pixel block; and applying a transformation to said processed m×m data array to form a block of coefficient data.

29. A method according to claim 28, wherein said processing step includes subsampling said $(m \cdot 2^q) \times (m \cdot 2^q)$ pixel block.

30. A method according to claim 28, wherein said detecting step includes:

applying a transformation to each m×m pixel block of said contiguous plurality of m×m pixel blocks, to form a respective array of coefficient data, some of said coefficient data representing respective spatial frequency components of the respective m×m pixel block; and detecting a characteristic of at least one of said coefficient data representing spatial frequency components.

31. A method according to claim 30, wherein said transformation applied to each m×m pixel block of said contiguous plurality of m×m pixel blocks is a two-dimensional DCT.

32. A method of performing data compression with respect to image data, said image data being representative of pixels arrayed in an image plane, the method comprising the steps of:

dividing said image data into a plurality of m×m pixel blocks, m being equal to $2^p$, p being an integer equal to or greater than 1;

combining a first contiguous plurality of said m×m pixel blocks to form an $(m \cdot 2^q) \times (m \cdot 2^q)$ pixel block, q being an integer equal to or greater than 1;

processing said $(m \cdot 2^q) \times (m \cdot 2^q)$ pixel block to form a first processed m×m data array representative of said $(m \cdot 2^q) \times (m \cdot 2^q)$ pixel block;

transform-encoding said first processed m×m data array to form compressed image data representative of said $(m \cdot 2^q) \times (m \cdot 2^q)$ pixel block;

combining a second contiguous plurality of said m×m pixel blocks to form an $(m \cdot 2^r) \times (m \cdot 2^r)$ pixel block, r being an integer equal to or greater than 1, r≠q;

processing said $(m \cdot 2^r) \times (m \cdot 2^r)$ pixel block to form a second processed m×m data array representative of said $(m \cdot 2^r) \times (m \cdot 2^r)$ pixel block; and transform-encoding said second processed m×m data array to form compressed image data representative of said $(m \cdot 2^r) \times (m \cdot 2^r)$ pixel block.

33. A method according to claim 32, wherein m=8.

34. A method according to claim 32, wherein each of said processing steps includes subsampling the respective pixel block.

35. A method according to claim 32, wherein each of said transform-encoding steps includes applying a two-dimensional DCT to the respective m×m data array to form coefficient data, quantizing the coefficient data, and Huffman-encoding the quantized coefficient data.

* * * * *

UNITED STATES PATENT AND TRADEMARK OFFICE
CERTIFICATE OF CORRECTION

PATENT NO. : 6,006,276
DATED : December 21, 1999
INVENTOR(S) : David Ross MacCormack, et al.

It is certified that error appears in the above-identified patent and that said Letters Patent are hereby corrected as shown below:

Col. 5, line 2, delete ' "IVR/PC" ' and insert -- "VR/PC" --.

Signed and Sealed this

Third Day of April, 2001

Attest:

NICHOLAS P. GODICI

Attesting Officer     Acting Director of the United States Patent and Trademark Office